March 22, 1955 O. KORNEI 2,704,789

MULTI-CHANNEL, FLUX RESPONSIVE, MAGNETIC REPRODUCER HEAD UNIT

Filed Nov. 6, 1953

*INVENTOR.*
OTTO KORNEI

*BY*

William J. Flynn

ATTORNEY

United States Patent Office 2,704,789
Patented Mar. 22, 1955

2,704,789

MULTI-CHANNEL, FLUX RESPONSIVE, MAGNETIC REPRODUCER HEAD UNIT

Otto Kornei, Cleveland Heights, Ohio, assignor to Clevite Corporation, Cleveland, Ohio, a corporation of Ohio Application November 6, 1953, Serial No. 390,669

4 Claims. (Cl. 179—100.2)

Figure 1:
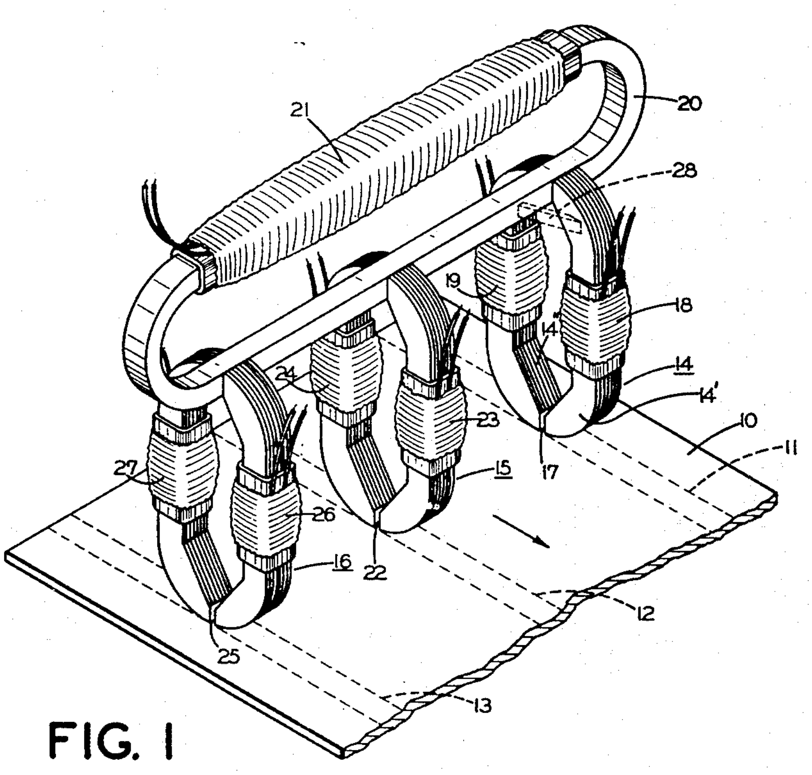

This invention relates to a multi-channel flux responsive magnetic head unit suitable for reproducing the recorded signals on a multi-channel magnetic record independent of the movement of the record past the head.

The most common practice in the art of magnetic reproduction relies upon the continuous, constant speed movement of a magnetized wire, tape or other record medium past a magnetic transducer head, which reproduces the signal on the record medium in response to such movement of the record medium. In such devices, if the record medium should stop the reproducer head would cease to reproduce the recorded signals because its operation depends upon the change of the flux induced in the core of the reproducer head by the magnetic signal at the record element bridging the gap of the reproducer head, the rate of change of flux depending upon the speed at which the record medium moves past the reproducer head. Systems of this type are universally employed in the reproduction of magnetic sound recordings.

For certain applications it is preferable to reproduce a magnetic record in a manner such that the reproduction is independent of the movement of the record medium past the reproducer head. This enables the reproduction of a magnetic record even while the record is stationary, thereby making it feasible to use with an intermittently or slowly moving record.

A magnetic head for this general purpose has been suggested in Swiss Patent 270,675. In this device a high-frequency excitation current creates a changing flux in an excitation core which intersects perpendicularly the core structure of the reproducing head. Because of the changing permeability of the section of the core structure of the reproducer head in common with the excitation core, which results from the changes in magnetic flux through the excitation core, the reluctance of the reproducer head varies at twice the excitation frequency. The output signal from the reproducer head, therefore, has a frequency of twice the excitation frequency and an amplitude proportional to the strength of the magnetic signal on the record element which is at the reproducing or playback gap of the head. The perpendicular disposition of the excitation core with respect to the core structure of the reproducer head insures that the excitation signal does not appear across the reproducing gap of the reproducer head to degrade, or even erase, the signal picked up from the magnetic record.

The reproducer head disclosed in the above-mentioned Swiss patent is limited in its utility to a single channel magnetic record, whereas there is today an ever-increasing demand for multi-channel records having information stored in a plurality of closely spaced record tracks. In many applications of multi-channel recording, in addition to the factor of the close proximity of the several channels on the record, there is an added requirement that the reproducing gaps of the playback heads be in substantial alignment, so that an exact phase relationship among the several channels may be maintained in the reproduction. For example, in geophysical exploration for oil it is quite important to maintain the precise time relationship among signals picked up by different geophones. Another application where it is important to maintain an accurate phase relationship among several record channels is in magnetic records from which it is intended to operate telemetering systems.

The dual requirements of close spacing and alignment of the reproducer heads cannot, as a practical matter, be met merely by assembling a plurality of the flux responsive heads of the above-mentioned Swiss patent in side-by-side relationship because of the impossibility of containing such an assembly within the limited space permitted by the close spacing of the several channels on the magnetic record.

However, these requirements are met in the present invention by the provision of a magnetic reproducer head unit in which a plurality of individual flux responsive magnetic transducer heads are mounted in closely spaced, parallel relation with their respective playback gaps in substantial alignment. The unit is provided with a single high frequency excitation core which intersects each of the transducer head cores at right angles thereto and causes the reluctance of each transducer head core to change in response to the high frequency excitation, thereby permitting the transducer heads to reproduce signals from the separate channels of the record independent of the movement of the record. The alignment of the playback gaps enables the desired phase relationship among the several record channels to be maintained.

Accordingly, it is an object of the present invention to provide a novel unitary, multi-channel, flux responsive, magnetic reproducer head assembly capable of continuously reproducing in proper phase relationship the magnetically recorded signals on a multi-channel record independent of the movement of the record.

Other and further objects and advantages of the present invention will be apparent from the following description of two embodiments thereof illustrated schematically in the accompanying drawing.

Figure 2:
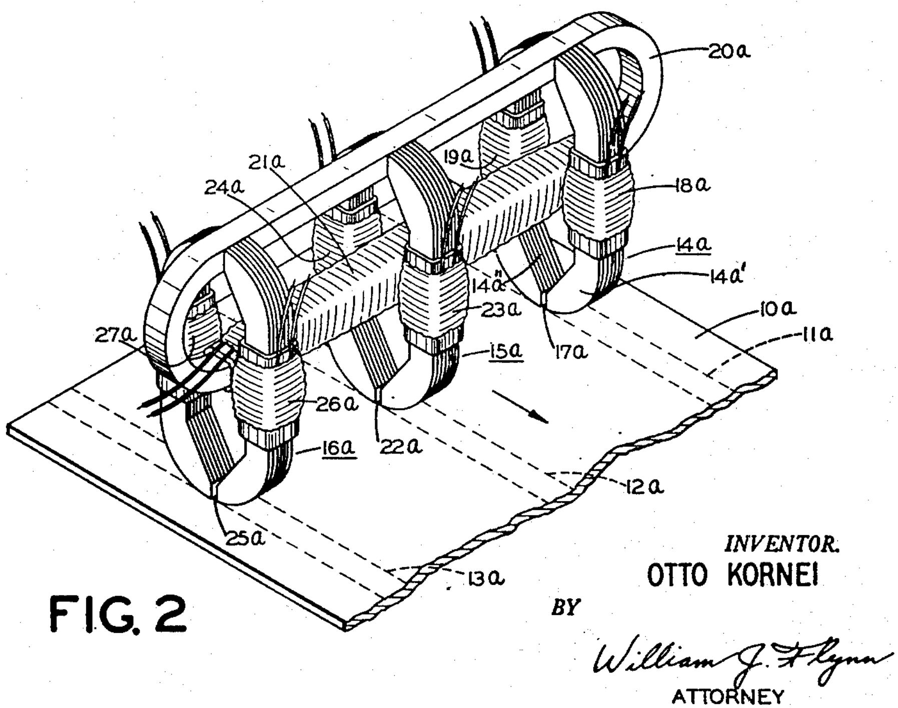

In the drawing:

Figure 1 is a perspective view showing schematically a flux responsive reproducer head unit in accordance with one embodiment of the present invention, positioned to reproduce signals from a multi-channel magnetic record; and Figure 2 is a similar view of a second embodiment of the reproducer head unit of the present invention.

Referring to Figure 1, the magnetic record is shown in the form of a tape 10 having a plurality of parallel, closely spaced magnetic record tracks 11, 12 and 13 which extend lengthwise along the tape in the direction in which the tape moves. For reproducing the magnetic signals from the individual tracks on the record there are provided a plurality of magnetic transducer heads 14, 15 and 16. Each of these heads is a so-called "ring head," comprising a substantially closed core of high permeability magnetic material having a narrow reproducing gap immediately adjacent the corresponding record channel and one or more coils wound around the core to have a voltage induced thereacross by changing flux through the core.

In Figure 1, the core of reproducer head 14 is in the form of two spaced laminated legs 14' and 14'' spaced close together at their lower ends immediately adjacent the record to define a narrow reproducing or playback gap 17. If desired, this gap may be filled with non-magnetic material, such as aluminum or bronze foil, to more precisely define the length of the gap and to prevent the gap from becoming clogged with magnetic powder from the record. Coils of wire 18 and 19 respectively are wound around the legs of this core and may be connected to a suitable output device (not shown).

At their respective ends remote from reproducing gap 17 the core legs 14' and 14'' are intersected by a straight leg portion of closed excitation core in the form of an oblong ring 20 of high permeability magnetic material, such that the magnetic path through the core of head 14 is completed through the intersecting portion of excitation core 20. In effect, therefore, the core of transducer head 14 has a portion of its extent in common with excitation core 20. A high frequency excitation coil 21 is wound around the return leg of core 20, which is disposed outside the magnetic transducer heads 14, 15 and 16. When a high frequency A. C. signal is applied to coil 21 it induces a correspondingly changing magnetic flux through core 20. The permeability of the ferromagnetic excitation core 20 changes with its magnetization, this permeability approaching unity for magnetization approaching saturation. It is known that the permeability of ferromagnetic material changes in the direction perpendicular to the direction of the magnetic flux, as well as in the direction of magnetic flux. Therefore, as a result of the changing flux through excitation core 20, the permeability of that portion of the excitation core which is in common with the core of transducer head 14 changes in the direction of the magnetic flux path through the core of transducer head 14. Because of this, the magnetic reluctance of the core of transducer head 14 is changed at twice the excitation frequency, thereby causing a corresponding change of any steady flux passing through this core. This operation generates a voltage in coils 18 and 19, even though the record track is stationary. This voltage has an amplitude proportional to the steady magnetic flux passing through the transducer head core, which, in turn, is proportional to the strength of the magnetic signal on the record track at the playback gap 17 of head 14, and a frequency twice the excitation frequency.

It will be noted that the excitation core 20 extends perpendicular to the core of head 14; that is, a longitudinal plane through excitation core 20 extends perpendicular to a plane through core legs 14′ and 14″ of magnetic transducer head 14. The core legs 14′ and 14″ are disposed symmetrically on opposite sides of excitation core 20. Because of the structural symmetry of this arrangement, the assembly is magnetically balanced and no part of the changing flux through excitation core 20 appears across the reproducing gap to influence the accurate reproduction of the recorded signal. Minor unbalances may be corrected by the provision of adjustable magnetic shunt pieces extending from the free faces of the head cores to the free faces of the intersecting leg of the excitation core. Such shunts preferably, are arranged near the intersection of head cores and excitation cores, as indicated at 28 in dotted lines in Figure 1.

The transducer heads 15 and 16 have laminated cores constructed identical to that of head 14 and extending in spaced parallel relation thereto. The core of head 15 defines a reproducing or playback gap 22 positioned to extend immediately adjacent the second record channel 12. Coils 23 and 24 are wound around the opposite legs of this core to have a voltage induced in response to changing flux through the core. Similarly the core of transducer head 16 defines a reproducing gap 25 located to extend immediately adjacent record channel 13. Output coils 26 and 27 are wound around the respective legs of the magnetic core of head 16 to have a voltage induced in response to changing flux through this core. Each of the cores of heads 15 and 16 is intersected at its end opposite the playback gap by the excitation core 20, so that these intersecting portions of the excitation core complete the magnetic paths for the reproducer head cores.

In the operation of the multi-channel reproducer head unit of Figure 1, high frequency excitation current applied to excitation coil 21 induces flux reversals through the excitation core 20. These flux reversals, in turn, change the permeability of that portion of the magnetic path for each transducer head core which extends through the excitation core 20. The resultant changes in the reluctance of each transducer head core occur at twice the excitation frequency. A voltage is induced in each of the output coils 18, 19, 23, 24, 26 and 27 which has an amplitude proportional to the strength of the magnetic signal on the record track immediately adjacent the reproducing gap of the corresponding head core.

It will be noted that the provision of a single excitation core for the several transducer heads enables the reproducer heads to be closely positioned across the record track in parallel relation, with their respective playback gaps in substantial alignment. Thus, this novel assembly in the present invention satisfies for a multi-channel, flux responsive, reproducer head unit the dual requirements of playback gap alignment and close positioning, mentioned above as being critical factors in certain applications of multi-channel record reproduction.

In the alternative embodiment of the present invention shown in Figure 2, the construction and arrangement of the transducer heads is identical to that described in detail above in connection with Figure 1. In Figure 2 the features are numbered in accordance with the corresponding features in Figure 1, with the subscript "*a*" being added after each of the reference numerals in Figure 2.

The only difference in the Figure 2 unit over that of Figure 1 is that the return portion of the excitation core 20*a* (that is, the portion of this core which interconnects the ends of the straight leg portion which intersects the cores of transducer heads 14*a*, 15*a* and 16*a*) extends through the central openings defined by the substantially closed cores of the transducer heads 14*a*, 15*a* and 16*a*. This particular structural arrangement results in a more compact assembly which will be advantageous in certain applications. The magnetic and electrical behavior of the Figure 2 unit is substantially identical to that of Figure 1, and hence need not be repeated in detail here.

While in the foregoing description and the accompanying drawing there have been disclosed two specific embodiments of the present invention, it is to be understood that various modifications, omissions and refinements which depart from the illustrated embodiments may be adopted without departing from the spirit and scope of this invention.

I claim:

1. A multi-channel flux responsive magnetic reproducer head unit, comprising a plurality of magnetic transducer heads each having a substantially closed magnetic core, said cores being mounted in closely spaced, parallel relationship, each of said transducer head cores defining a reproducing gap and said reproducing gaps of the several cores extending in substantial alignment, a single closed high permeability excitation core intersecting each of said transducer head cores at right angles thereto and having portions of its extent in common respectively with a portion of each transducer head core, and a high frequency excitation coil wound around said excitation core for changing the flux through said excitation core in response to high frequency current through the excitation coil to thereby vary the reluctance of each of said transducer head cores.

2. A multi-channel flux responsive magnetic reproducer head assembly, comprising a plurality of magnetic transducer heads each having a substantially closed core of magnetic material which defines a reproducing gap, said transducer head cores being disposed in closely spaced, parallel relationship with their respective reproducing gaps extending in substantial alignment transversely across the assembly of cores, output coils wound around said cores and responsive to changing flux therein to produce output voltages, a single closed high permeability excitation core extending perpendicular to each of said transducer head cores, said excitation core having a straight leg intersecting each of said transducer head cores opposite the reproducing gap thereof and completing the magnetic path for each head core thereat, and a high frequency excitation coil wound around said excitation core for changing the flux therein when high frequency current is supplied to the excitation coil to thereby vary the reluctance of each of said transducer head cores.

3. The assembly of claim 2, wherein said excitation core has a portion interconnecting the opposite ends of said straight leg and disposed outside said transducer head cores, and said excitation coil is wound around said interconnecting portion of the excitation core.

4. The assembly of claim 2, wherein said excitation core has a portion interconnecting the opposite ends of said straight leg and extending through the openings formed by said transducer head cores, and said excitation coil is wound around said interconnecting portion of the excitation core.

No references cited.